(12) United States Patent
Amemiya et al.

(10) Patent No.: US 12,291,256 B2
(45) Date of Patent: May 6, 2025

(54) CARRIER DEVICE WITH COUPLING MECHANISM

(71) Applicant: NHK SPRING CO., LTD., Yokohama (JP)

(72) Inventors: Tsuyoshi Amemiya, Yokohama (JP); Yuta Souda, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 683 days.

(21) Appl. No.: 17/564,248

(22) Filed: Dec. 29, 2021

(65) Prior Publication Data

US 2022/0219746 A1 Jul. 14, 2022

(30) Foreign Application Priority Data

Jan. 14, 2021 (JP) .................................. 2021-004117

(51) Int. Cl.
*B62B 3/04* (2006.01)

(52) U.S. Cl.
CPC ............ *B62B 3/04* (2013.01); *B62B 2202/90* (2013.01)

(58) Field of Classification Search
CPC .............................. B62B 3/04; B62B 2202/90
See application file for complete search history.

(56) References Cited

U.S. PATENT DOCUMENTS

| | | | |
|---|---|---|---|
| 4,880,341 A | 11/1989 | Van Den Pol | |
| 5,092,722 A | 3/1992 | Reazer et al. | |
| 5,092,772 A | 3/1992 | Seaton | |
| 7,516,855 B2* | 4/2009 | Konstant | ................. A47F 5/137 |
| | | | 211/162 |
| 7,770,903 B2* | 8/2010 | Konstant | ................... B62B 3/04 |
| | | | 211/151 |
| 7,850,020 B2* | 12/2010 | Konsant | ................... B65G 1/00 |
| | | | 211/1 |

(Continued)

FOREIGN PATENT DOCUMENTS

| | | |
|---|---|---|
| CN | 102535915 A | 7/2012 |
| CN | 107914937 A | 4/2018 |

(Continued)

OTHER PUBLICATIONS

Related U.S. Appl. No. 17/564,245; First Named Inventor: Tsuyoshi Amemiya; Title: "Carrier Device With Coupling Mechanism"; filed Dec. 29, 2021.

(Continued)

*Primary Examiner* — James A English
*Assistant Examiner* — Michael R Stabley
(74) *Attorney, Agent, or Firm* — Holtz, Holtz & Volek PC

(57) ABSTRACT

A carrier device includes a coupling mechanism for connecting an automatic controlled vehicle to a carriage. The coupling mechanism includes a first roller assembly and a second roller assembly. The first roller assembly includes a first roller and a third roller, provided on a first common shaft. The second roller assembly includes a second roller and a fourth roller, provided on a second common shaft. The first roller and the second roller can enter a gap of the guide rail section in the automatic controlled vehicle. When the lock member moves from the first position to the second position, the lock member is sandwiched between the third roller and the fourth roller.

5 Claims, 8 Drawing Sheets

(56) References Cited

U.S. PATENT DOCUMENTS

| | | |
|---|---|---|
| 10,364,065 B2 | 7/2019 | Raninen et al. |
| 10,589,640 B2 | 3/2020 | Nakamura et al. |
| 10,894,453 B2 | 1/2021 | Fujihara et al. |
| 10,994,579 B2 | 5/2021 | Adachi et al. |
| 11,148,697 B2 | 10/2021 | Akamatsu et al. |
| 2005/0279608 A1 | 12/2005 | Konstant |
| 2008/0203706 A1 | 8/2008 | Konstant |
| 2018/0139887 A1 | 5/2018 | Payne et al. |
| 2019/0270472 A1 | 9/2019 | Akamatsu et al. |
| 2020/0276998 A1 | 9/2020 | Coats et al. |

FOREIGN PATENT DOCUMENTS

| | | |
|---|---|---|
| CN | 109109684 A | 1/2019 |
| CN | 109421452 A | 3/2019 |
| CN | 109476195 A | 3/2019 |
| CN | 109476325 A | 3/2019 |
| CN | 210706757 U | 6/2020 |
| JP | S56110058 U | 8/1981 |
| JP | 2004262288 A | 9/2004 |
| JP | 2013232078 A | 11/2013 |
| JP | 2018024415 A | 2/2018 |
| JP | 2019162953 A | 9/2019 |

OTHER PUBLICATIONS

Japanese Office Action (and an English language translation thereof) dated Jan. 23, 2024, issued in Japanese Application No. 2021-004118 (which is a counterpart of related U.S. Appl. No. 17/564,245).
Chinese Office Action (and an English language translation thereof) dated Apr. 21, 2023, issued in Chinese Application No. 202210018555.3 (which is a counterpart of related U.S. Appl. No. 17/564,245).
Chinese Office Action (and an English language translation thereof) dated Nov. 22, 2024, issued in counterpart Chinese Application No. 202210018553.4.

* cited by examiner

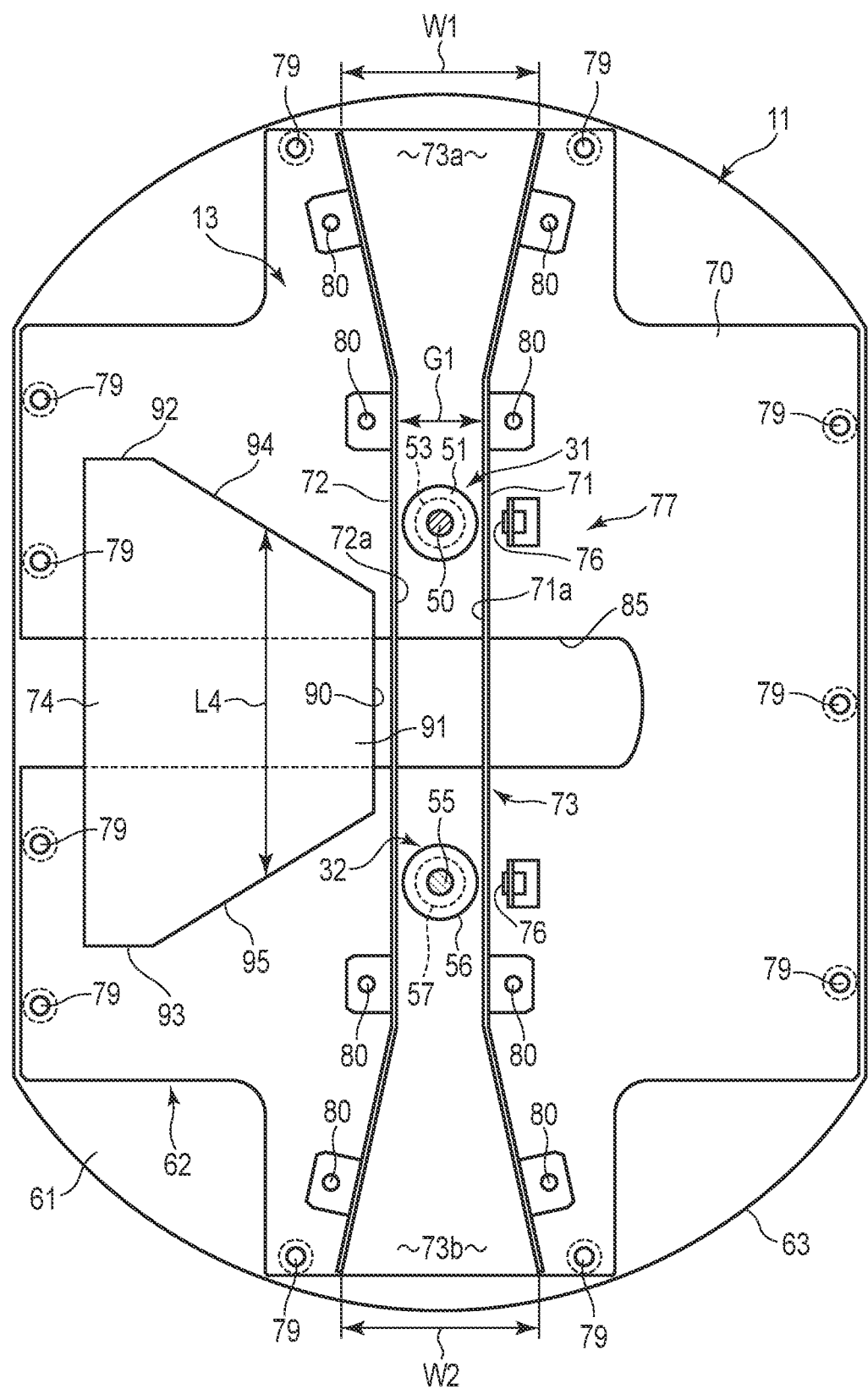
F I G. 7

CARRIER DEVICE WITH COUPLING MECHANISM

CROSS-REFERENCE TO RELATED APPLICATIONS

This application is based upon and claims the benefit of priority from prior Japanese Patent Application No. 2021-004117, filed Jan. 14, 2021, the entire contents of which are incorporated herein by reference.

BACKGROUND OF THE INVENTION

1. Field of the Invention

The present invention relates to a carrier device comprising a coupling mechanism for coupling, for example, a caster-mounted carriage to an automatic controlled vehicle.

2. Description of the Related Art

In production sites such as factories, warehouses and the like, caster-mounted carriages are used to move objects to be carried. The caster-mounted carriages may be carts or wagons. To move the carriages to desired locations, an automatic controlled vehicle may be used. In this case, each carriage is coupled to the automatic controlled vehicle via a coupling mechanism. The coupling mechanism couples the carriage and the automatic controlled vehicle to each other as needed. The coupling mechanism can also decouple the carriage from the automatic controlled vehicle.

JP 2013-232078 A (Patent Literature 1) describes an automatic controlled vehicle including a coupling mechanism that uses a coupling pin. The automatic controlled vehicle is configured to be able to enter the undersides of carriages. The coupling mechanism includes a coupling pin, a drive mechanism for moving the coupling pin in the vertical direction, and a pin receiving portion. The coupling pin is provided on an upper surface of the automatic controlled vehicle. The pin receiving portion is provided on the lower surface of the carriage. The coupling pin is ascended by the drive mechanism, and then, the coupling pin is inserted to the pin receiving portion. Thus, the carriage is coupled to the automatic controlled vehicle.

JP 2019-162953 A (Patent Literature 2) describes an automatic controlled vehicle including a coupling portion. The coupling portion includes a coupling rod and a clamping mechanism. The coupling rod is provided on the lower surface of the carriage. The clamping mechanism is provided on the upper surface of the automatic controlled vehicle. While the automatic controlled vehicle is inserted underneath the carriage, the coupling rod is grasped with the clamping mechanism. Thus, the carriage is coupled to the automatic controlled vehicle.

JP 2018-24415 A (Patent Literature 3) describes an automatic controlled vehicle comprising a guide portion and a coupling mechanism. The first example of the coupling mechanism described in Patent Literature 3 includes a pair of guide portions, a coupled member and a coupling pin. The pair of guide portions are provided on the upper surface of the automatic controlled vehicle. The coupled member is provided on the lower surface of the carriage. The coupling pin is movable along the horizontal direction. The coupled member includes a pin receiving hole formed therein to insert the coupling pin thereto. While the coupled member is inserted between the guide portions, the coupling pin is inserted to the pin receiving hole. Thus, the carriage is coupled to the automatic controlled vehicle.

The second example of the coupling mechanism in Patent Literature 3 comprises a pair of guide portions, a pair of coupling shafts and a coupling member. The pair of guide portions are provided on the upper surface of the automatic controlled vehicle. The pair of coupling shafts are provided on the lower surface of the carriage. The coupling member is movable along the horizontal direction. While the coupling shafts are inserted between the guide portions, the coupling member is pressed against the coupling shafts. Thus, the carriage is coupled to the automatic controlled vehicle.

In the coupling mechanism described in Patent Literature 1, the coupling pin is inserted to the pin receiving portion. With this structure, if the relative positions of the automatic controlled vehicle and the carriage are shifted even slightly during coupling, the coupling pin cannot be inserted to the pin receiving portion.

The clamping mechanism described in the above-mentioned patent document 2 can be used even if the positioning accuracy of the automatic controlled vehicle relative to the carriage may be loose. However, when the automatic controlled vehicle and the carriage turned around the vertical axis, excessive load is applied to the clamping mechanism, which undesirably may easily cause damage to the clamping mechanism.

In the first example of Patent Literature 3, the horizontally movable metal-made coupling pin is inserted to the pin receiving hole of the metal-made coupled member. With such a structure, contact noise between the coupling pin and the pin receiving hole and vibration thereof are problematic. Especially in clean rooms where a clean environment is required, the generation of fine particles (micro-particles) by friction between metals creates a major problem. In the second example of Patent Literature 3, the coupling member is pressed against the coupling shaft. In such a structure, it is necessary to keep pressing the coupling member against the coupling rod with a large force. Therefore, a great amount of consumption energy is involved, placing a heavy load on the battery. Further, the rigidities of the coupling member and the coupling shaft need to be considerably increased.

The present invention provides a carrier device comprising a coupling mechanism that has a large coupling strength between the automatic controlled vehicle and the carriage and also can suppress generation of dust such as metal particles.

BRIEF SUMMARY OF THE INVENTION

According to one embodiment, a carrier device comprises a coupling mechanism that couples an automatic controlled vehicle to a carriage. The coupling mechanism comprises a first roller, a second roller, a third roller and a fourth roller. The roller are disposed on the carriage. The first roller rotates around a first axial line extending in a vertical direction. The second roller is disposed on the carriage with an interval from the first roller. The second roller rotates around a second axial line extending in the vertical direction. The third roller rotates around an axial line extending in a same direction as the first axial line, independent of the first roller. The fourth roller rotates around an axis extending in a same direction as that of the second axis, independent of the second roller.

The coupling mechanism comprises a guide rail section disposed on the automatic controlled vehicle, a lock member provided in the automatic controlled vehicle and an actuator. The guide rail section includes a pair of rail members extending in a horizontal direction. Between the pair of rail members, a gap is formed, in which the first roller and the second roller can enter. The lock member moves between a first position and a second position. When the lock member is moved from the first position to the second position, the lock member is sandwiched between the third roller and the fourth roller. The actuator moves the lock member between the first position and the second position.

According to a carrier device comprising a coupling mechanism according to this embodiment, a large coupling strength can be obtained between the automatic controlled vehicle and the carriage, and further the generation of dust can be suppressed.

The coupling mechanism may include a first common shaft that supports the first roller and the third roller rotatably. The diameter of the first roller may be greater than a diameter of the third roller. The coupling mechanism may include a second common shaft that supports the second roller and the fourth roller rotatably. The diameter of the second roller may be greater than the diameter of the fourth roller. The first roller, the second roller, the third roller and the fourth roller may each comprise a roller body made of a material having rubber elasticity.

An example of the guide rail section may include straight portions that form longitudinal parts of the pair of rail members, respectively, a first expanding portion and a second expanding portion. In the straight portions, the rail members are parallel to each other. In the first expanding portion, the gap expands as a distance from one end of the straight portions increases. In the second expanding portion, the gap expands as a distance from the other end of the straight portion increases.

The lock member may include an end surface, one side surface, the other side surface and a pair of tapered surfaces. The end surface is in a front side of the lock member when moving from the first position to the second position. The one side surface and the other side surface are on a rear side when the lock member is moving. The distance between the pair of tapered surfaces decreases from the one side surface and the other side surface toward the end surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a plan view showing the automatic controlled vehicle of the carrier device and a part of the carriage.

DETAILED DESCRIPTION OF THE INVENTION

A carrier device according to the first embodiment will be described with reference to FIGS. 1 to 8.

Figure 1:
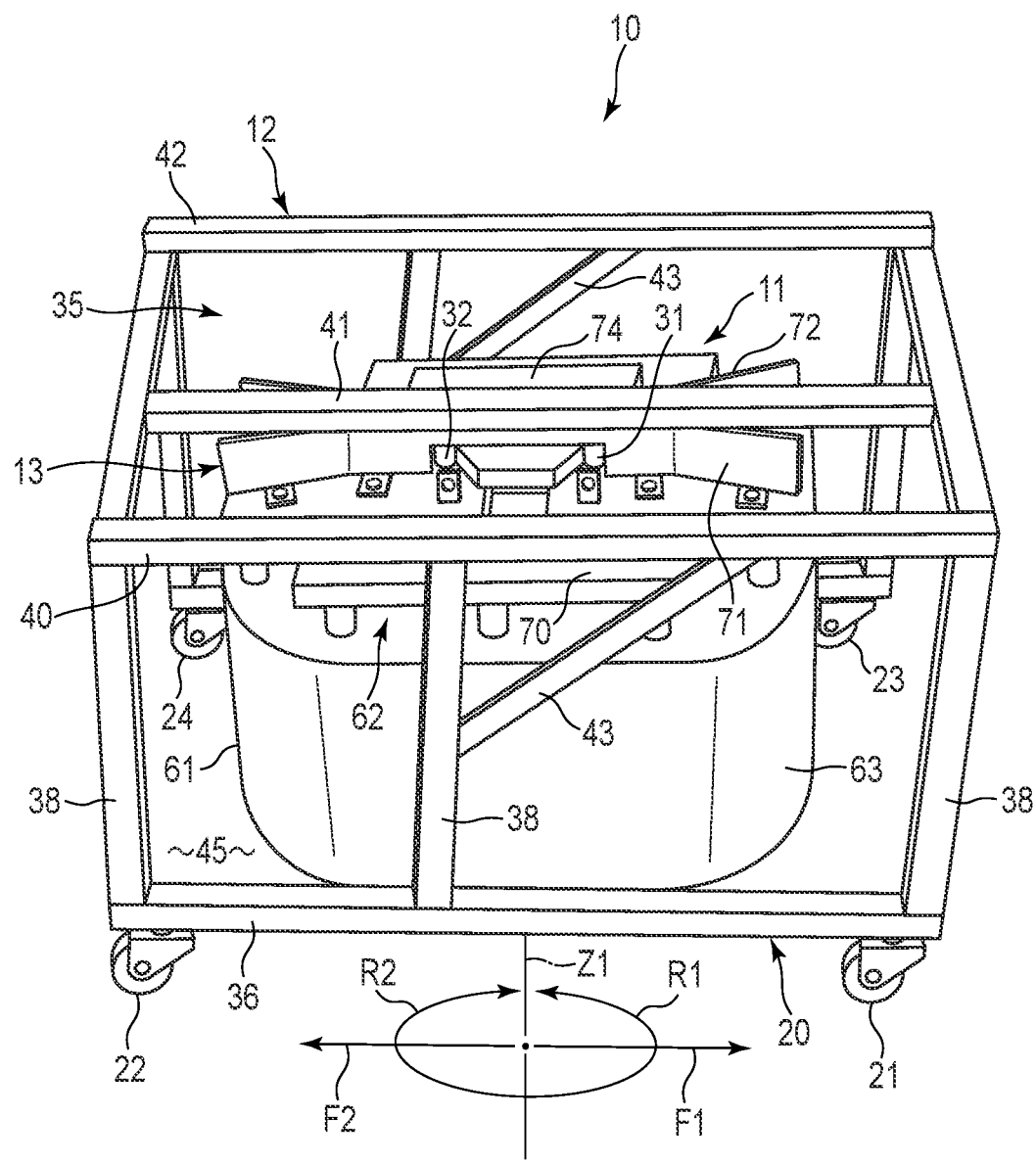
FIG. 1 is a perspective view of a carrier device according to a first embodiment.
Figure 2:
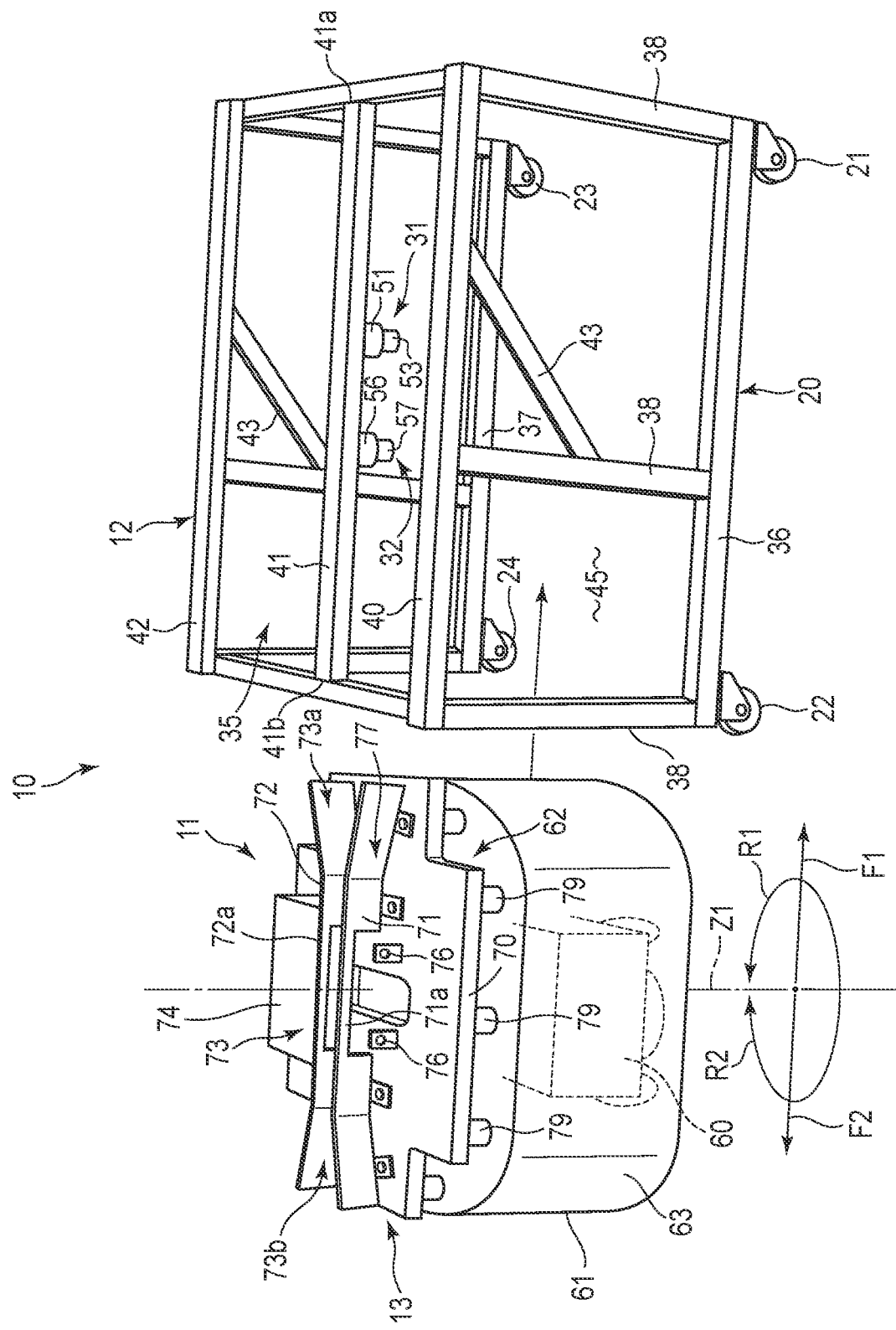
FIG. 2 is a perspective view of the carrier device shown in FIG. 1 while an automatic controlled vehicle thereof and a carriage are separated from each other.
Figure 3:
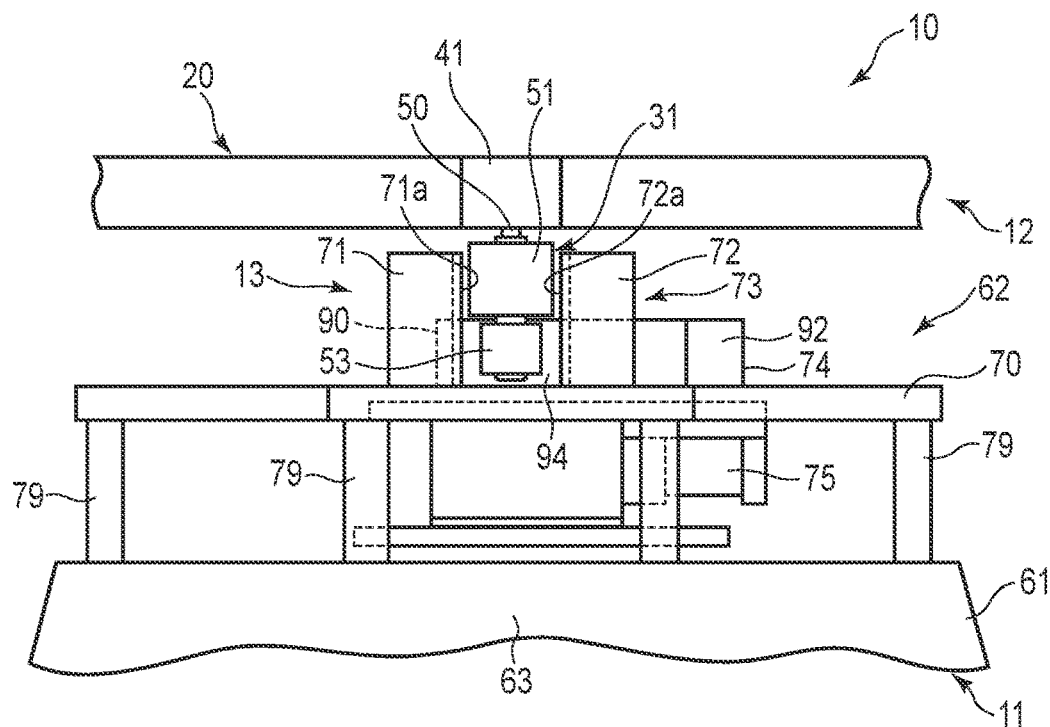
FIG. 3 is a front view partially showing the carrier device.

FIG. 1 is a perspective diagram showing a carrier device 10. The carrier device 10 includes an automatic controlled vehicle 11, a carriage 12 and a coupling mechanism 13. The coupling mechanism 13 has the function of coupling the automatic controlled vehicle 11 and the carriage 12 to each other. FIG. 2 shows the state where the automatic controlled vehicle 11 is separated from the carriage 12. FIG. 3 shows a front view of a part of the carrier device 10.

The automatic controlled vehicle 11 will be explained in detail later, and the carriage 12 will be explained first.

The carriage 12 comprises a frame structure 20, casters 21, 22, 23 and 24, a first roller assembly 31 and a second roller assembly 32. The first roller assembly 31 and the second roller assembly 32 are each provided in the frame structure 20. The roller assemblies 31 and 32 form a part of the coupling mechanism 13. In an upper portion of the frame structure 20, a loading section 35 (shown in FIGS. 1 and 2) is formed for loading an object to be carried thereon.

The frame structure 20 includes a pair of lower frames 36 and 37, a vertical frame 38, upper frames 40, 41 and 42, a reinforcing member 43 and the like. The vertical frame 38 extends along the vertical direction. Under the upper frames 40, 41 and 42, a space section 45 is formed. To the space section 45, the automatic controlled vehicle 11 can enter from the horizontal direction.

The casters 21 and 22 are provided on respective ends of the lower frame 36. The casters 23 and 24 are also provided on respective ends of the other lower frame 37. The casters 21, 22, 23 and 24 can each rotate around a vertical axis. The casters 21, 22, 23 and 24 can change their orientations according to the direction of movement of the carriage 12.

The first roller assembly 31 and the second roller assembly 32 have structures common to each other. The first roller assembly 31 is provided at a position of the upper frame 41, which is closer to one longitudinal end 41a thereof. The second roller assembly 32 is provided at a position of the upper frame 41, which is closer to the other longitudinal end 41b thereof. A cross section of the first roller assembly 31 is shown in FIG. 4.

Figure 4:
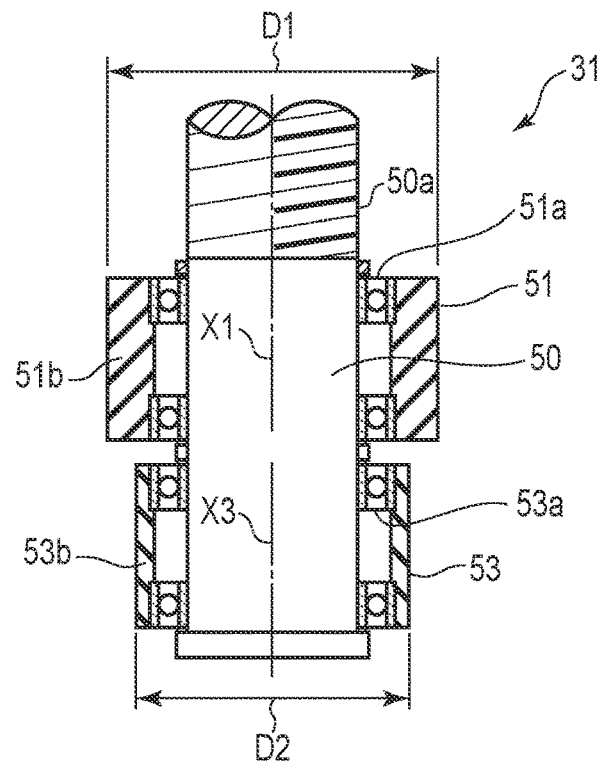
FIG. 4 is a cross-sectional view of the carrier device taken along an axis of a first roller assembly.

As shown in FIG. 4, the first roller assembly 31 includes a first common shaft 50, a first roller 51, and a third roller 53. The first common shaft 50 extends in the vertical direction. The first roller 51 and the third roller 53 are provided on the first common shaft 50. The first common shaft 50 extends from the upper frame 41 downwards. The first common shaft 50 is fixed to a lower surface side of the upper frame 41 by a screw portion 50a.

The first, roller 51 is attached to the first common shaft 50 by a bearing member 51a. The first roller 51 can rotate around a first axial line X1 (shown in FIGS. 4 and 5). The first axial line X1 extends in the vertical direction. The third roller 53 is attached to the first common shaft 50 by a bearing member 53a. The third roller 53 can rotate around an axial line X3 (shown in FIG. 5). The axial line X3 extends in the same direction as that of the first axial line X1.

The first roller 51 includes a roller body 51b (shown in FIG. 4). The roller body 51b is made, for example, of a material having rubber elasticity such as a urethane elastomer. The third roller 53 includes a roller body 53b. The roller body 53b is made, for example, of a material having rubber elasticity such as urethane elastomer. A diameter D1 of the first roller 51 is greater than a diameter D2 of the third roller 53. The first roller 51 and the third roller 53 rotate around the first common shaft 50 independently of each other.

Figure 5:
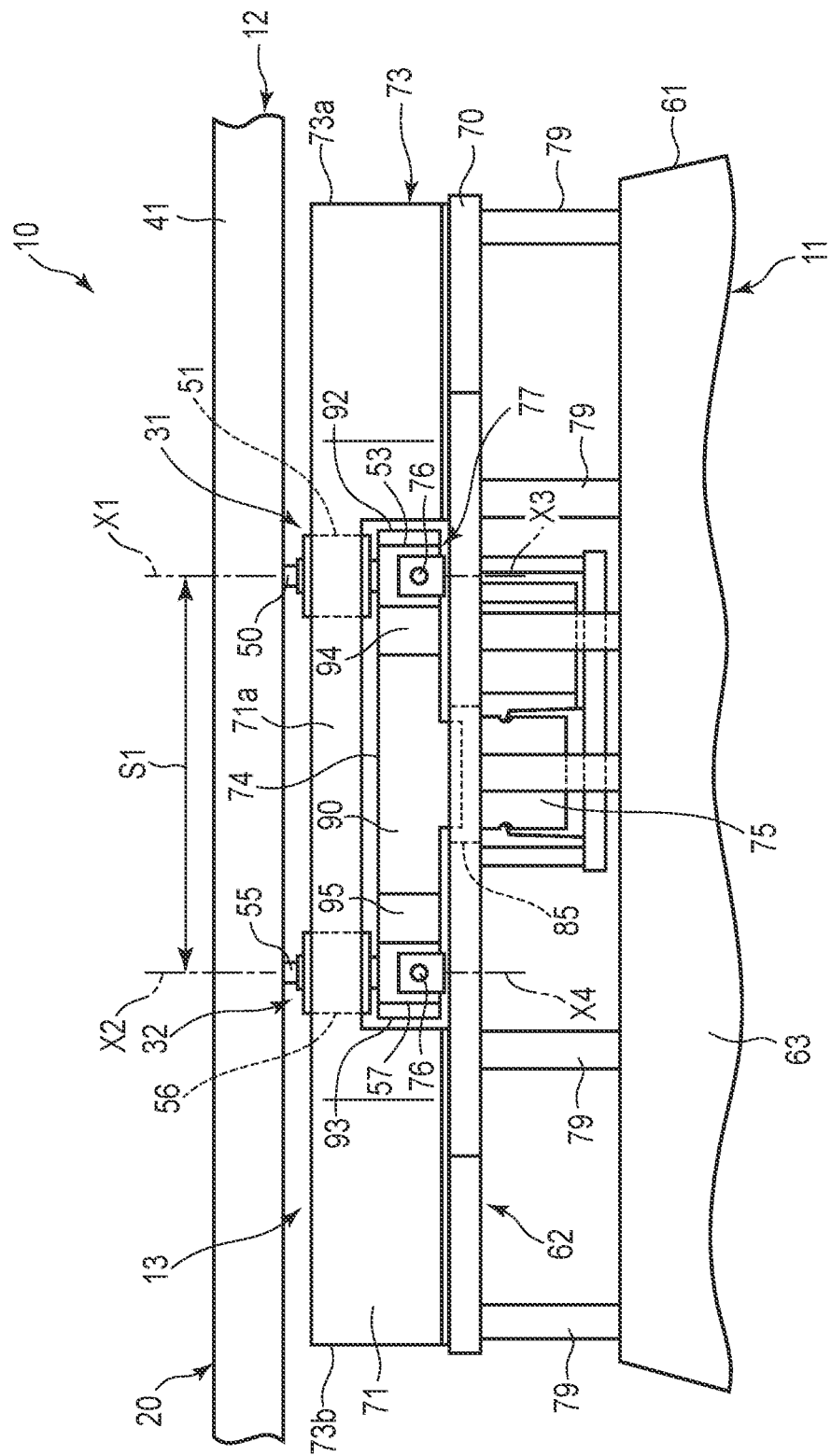
FIG. 5 is a side view partially showing the carrier device.
Figure 8:
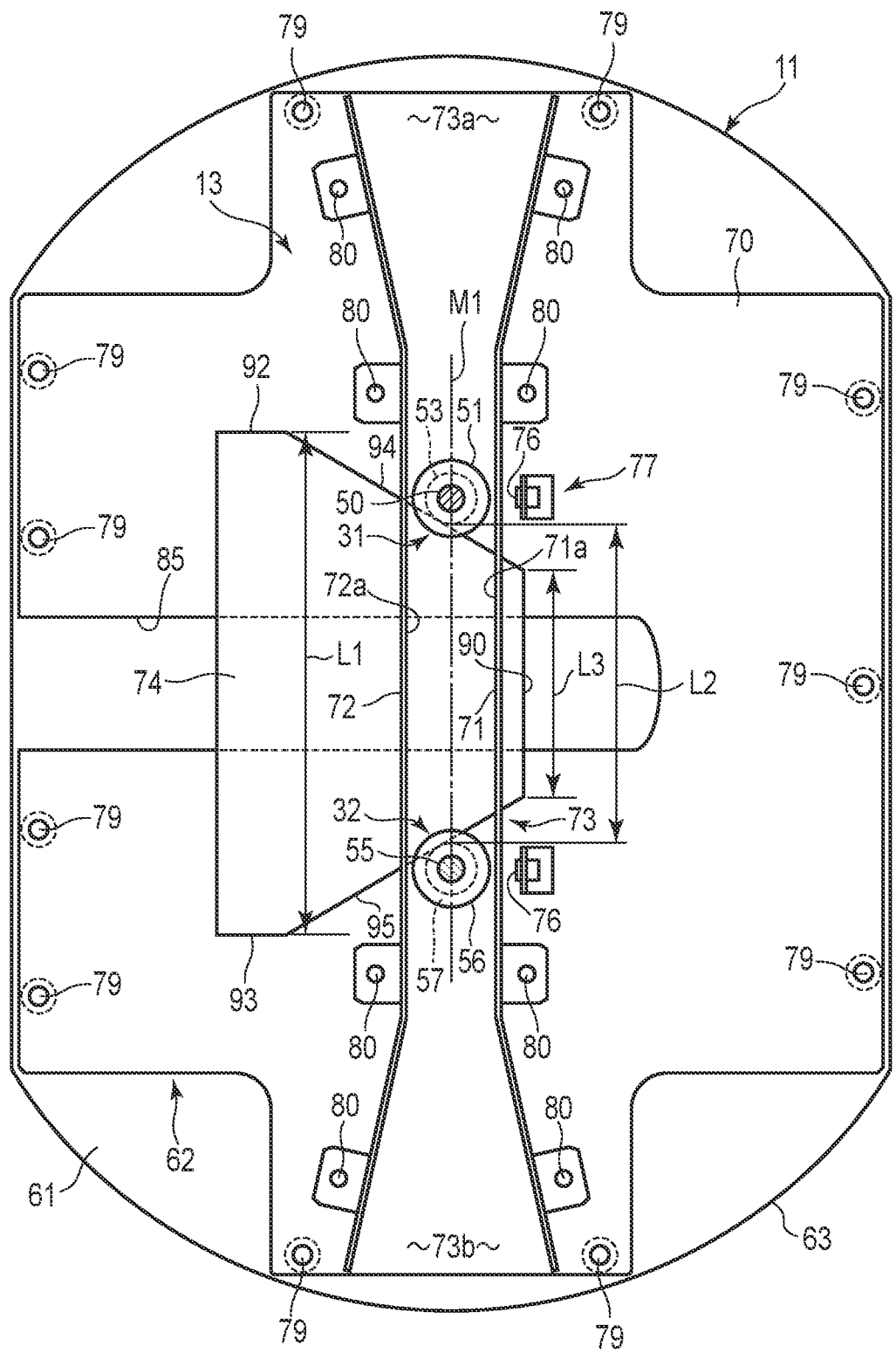
FIG. 8 is a plan view showing a state where the carriage is coupled by the lock member to the carrier device.

As shown in FIGS. 5, 7 and 8 the second roller assembly 32 includes a second common shaft 55, a second roller 56 and a fourth roller 57. The second common shaft 55 extends in the vertical direction. The second roller 56 and the fourth roller 57 are provided on the second common shaft 55. The second common shaft 55 is fixed to the lower surface side of the upper frame 41 by screws as in the case of the first common shaft 50. The second common shaft 55 extends downwards from the upper frame 41.

The second roller 56 is attached to the second common shaft 55 by a bearing member. The second roller 56 can rotate around the second axial line X2 (shown in FIG. 5). The second axial line X2 extends in the vertical direction. The fourth roller 57 is attached to the second common shaft 55 by a bearing member. The fourth roller 57 can rotate around the axial line X4 (shown in FIG. 5). The axial line X4 extends in the same direction as that of the second axial line X2.

The second roller 56 and the fourth roller 57 each includes a roller body. The roller body is made, for example, of a material having rubber elasticity such as urethane elastomer. The diameter of the second roller 56 is greater than that of the fourth roller 57. The second roller 56 and the fourth roller 57 rotate around the second common shaft 55 independently of each other.

FIG. 8 is a plan view of the automatic controlled vehicle 11 as viewed from above. As shown in FIG. 8, the first roller assembly 31 and the second roller assembly 32 are arranged along an imaginary straight line M1 extending in the horizontal direction. FIG. 5 is a side view of a part of the automatic controlled vehicle 11. As shown in FIG. 5, the first common shaft 50 and the second common shaft 55 are disposed on the upper frame 41 with a predetermined distance S1 therebetween in the horizontal direction from each other.

Next, the automatic controlled vehicle 11 will be described.

Figure 6:
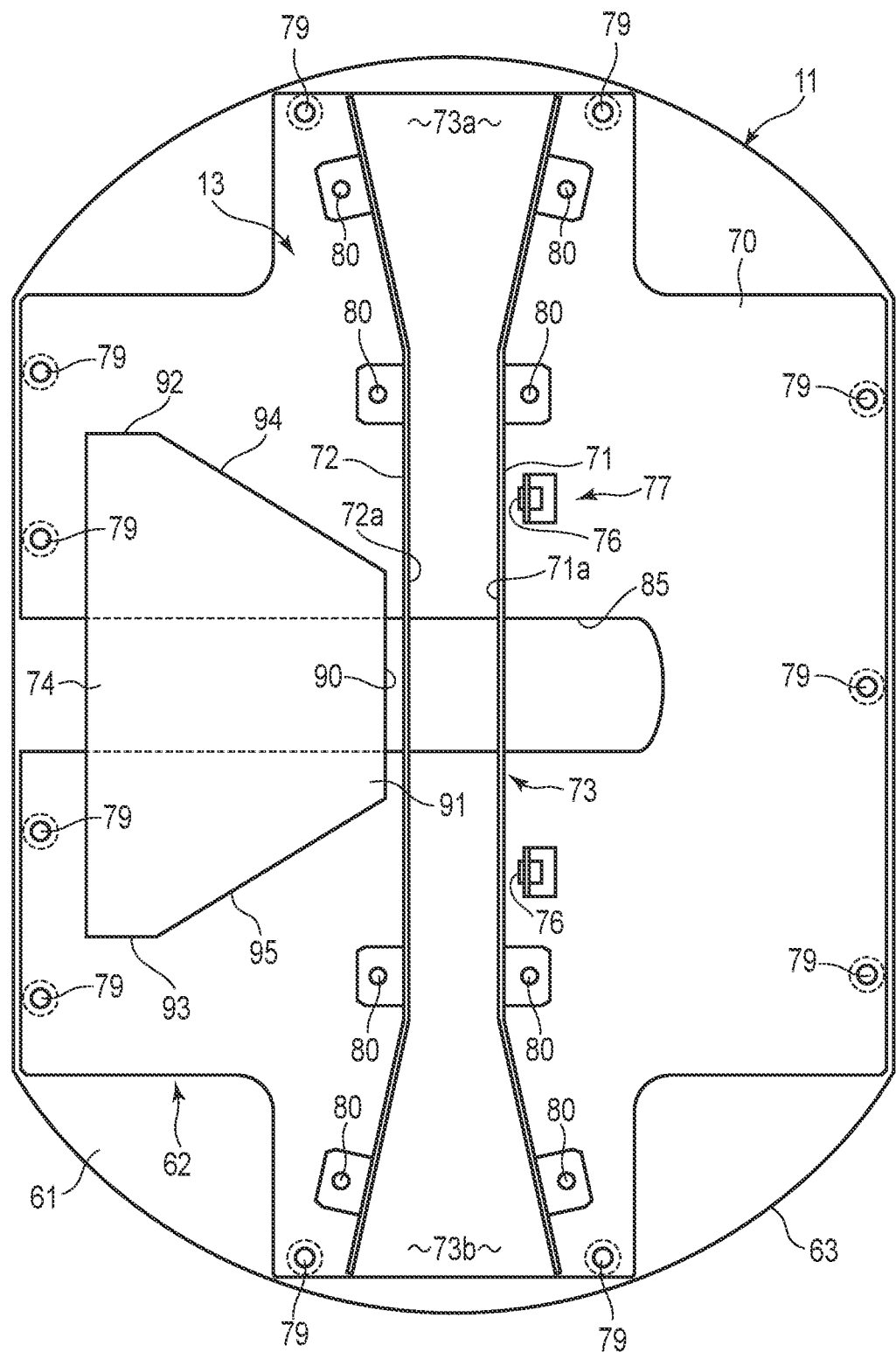
FIG. 6 is a plan view of the automatic controlled vehicle of the carrier device.

FIG. 6 is a plan view showing the automatic controlled vehicle 11. The automatic controlled vehicle 11 includes a vehicle main body 61 and a coupling unit 62. The vehicle main body 61 includes a traveling mechanism 60 (shown in FIG. 2). The traveling mechanism 60 is covered by a cover member 63. The coupling unit 62 is disposed on top of the vehicle main body 61. The vehicle main body 61 contains software and electrical components for controlling automatic operation. The vehicle main body 61 runs along a predetermined travel path.

The traveling mechanism 60 comprises wheels. The vehicle main body 61 moves in a first direction (indicated by arrow F1) and a second direction (indicated by arrow F2) by the traveling mechanism 60. The traveling mechanism 60 also comprises a steering mechanism. The vehicle main body 61 can be swiveled around the vertical axis Z1 by the steering mechanism. That is, the vehicle main body 61 can swivel in the first rotational direction indicated by the arrow R1 and in the second rotational direction indicated by the arrow R2 in FIG. 2.

The coupling unit 62 is provided on top of the vehicle main body 61. The coupling unit 62 forms a part of the coupling mechanism 13. The coupling unit 62 includes a base plate 70, a guide rail section 73 including a pair of rail members 71 and 72, a lock member 74, an actuator 75 (shown in FIGS. 3 and 5), a detecting section 77 including a plurality of sensors 76 and the like. The base plate 70 expands in substantially horizontal direction. The pair of rail members 71 and 72 are disposed on top of the base plate 70. The lock member 74 is moved along the horizontal direction by the actuator 75. The detecting section 77 has the function of detecting the carriage 12. The base plate 70 is fixed to the upper surface of the vehicle main body 61 by a plurality of fixing members 79 such as bolts.

The pair of rail members 71 and 72 are each made of, for example, a metal plate. The rail members 71 and 72 are fixed to the base plate 70 by fixing members 80 (shown in FIGS. 6 to 8). The rail members 71 and 72 includes straight portions 71a and 72a, respectively. The straight portions 71a and 72a are parallel to each other and extend along the horizontal direction. The straight portions 71a and 72a form longitudinal parts of the rail members 71 and 72, respectively.

Between the straight portions 71a and 72a, a gap G1 (shown in FIG. 7) is formed. The gap G1 is slightly greater than the diameter D1 (shown in FIG. 4) of the first roller 51. The gap G1 is slightly greater than the diameter of the second roller 56. For example, the gap G1 is 1 mm to several mm greater than the diameter D1 of the first roller 51. The gap G1 is 1 mm to several mm greater than the diameter of the second roller 56. With this structure, the first roller 51 and the second roller 56 can enter the gap G1.

At one end side of the guide rail section 73, a first expanding portion 73a is formed. At the other end side of the guide rail section 73, a second expanding portion 73b is formed. FIG. 6 is a plan view of the automatic controlled vehicle 11 viewed from above. As viewed from above, the guide rail section 73 incudes the first expanding portion 73a and the second expanding portion 73b. In the first expanding portion 73a, as the distance from one end of the straight portion 71a or 72a increases, the distance (gap G1) between the rail members 71 and 72 increases. An inlet width W1 of the first expanding portion 73a is twice or more the diameter D1 of the first roller 51. The inlet width W1 is also twice or more the diameter of the second roller 56. With this structure, the first roller 51 and the second roller 56 can each easily enter between the rail members 71 and 72.

In the second expanding portion 73b, as the distance from the other end of the straight portion 71a or 72a increases, the distance (gap G1) between the rail members 71 and 72 increases. An inlet width W2 of the second expanding portion 73b is twice or more the diameter D1 of the first roller 51. The inlet width W2 is also twice or more the diameter of the second roller 56. With this structure, the first roller 51 and the second roller 56 can each easily enter between the rail members 71 and 72.

The detecting section 77 including a plurality of sensors 76 detects at least one of the first roller assembly 31 and the second roller assembly 32 when the automatic controlled vehicle 11 enters the space section 45 of the carriage 12.

As shown in FIGS. 6 to 8, a groove 85 is formed in the base plate 70. The groove 85 extends in a direction perpendicular to the straight portions 71a and 72a of the rail members 71 and 72. The lock member 74 can move horizontally along the groove 85. The lock member 74 moves over between a first position (a standby position) shown in FIGS. 6 and 7 and a second position (a locked position) shown in FIG. 8. The actuator 75 (shown in FIGS. 3 and 5) is provided on the base plate 70. The actuator 75 moves the lock member 74 to the first position and the second position. For example, the actuator 75 is a ball screw mechanism with a servo motor as the driving source.

As viewing the automatic controlled vehicle 11 from above, the lock member 74 includes an end portion 91 including an end surface 90, one side surface 92, an other side surface 93, and a pair of tapered surfaces 94 and 95. When the lock member 74 moves from the first position to the second position, the end surface 90 becomes the front side. The end surface 90 extends in the same direction as that of the straight portions 71a and 72a of the rail members 71 and 72. When the lock member 74 moves from the first position toward the second position, the one side surface 92 and the other side surface 93 become the rear side. The one side surface 92 and the other side surface 93 extend in a direction parallel to the groove 85.

FIG. 8 shows a distance L1 taken between the one side surface 92 and the other side surface 93. A distance L2 is also taken between the third roller 53 and the fourth roller 57. Here, note that L1 is sufficiently greater than L2. A width L3 of the end surface 90 is sufficiently smaller than the distance L2 between the third roller 53 and the fourth roller 57. That is, the relationship here is L1>L2>L3. In the meantime, the one tapered surface 94 is formed between the end surface 90 and one side surface 92. The other tapered surface 95 is formed between the end surface 90 and the other side surface 93.

FIG. 7 shows a distance L4 taken between the tapered surfaces 94 and 95. The distance L4 decreases as the location approaches the end surface 90 from the one side surface 92 and the other side surface 93. When the lock member 74 moves to the second position, one of the tapered surfaces 94 and 95 is brought into contact with the third roller 53 and the other tapered surface is brought into contact with the fourth roller 57. The taper surfaces 94 and 95 with such structures are formed in the lock member 74. Thus, even if the relative positions of the automatic controlled vehicle 11 and the carriage 12 are slightly displaced with respect to each other, the lock member 74 can enter between the third roller 53 and the fourth roller 57.

Now, the operation of the carrier device 10 of this embodiment will be described.

First, towards the carriage 12, which is stopped, the automatic controlled vehicle 11 moves in a direction approaching the carriage 12. Then, the automatic controlled vehicle 11 enters the space section 45 inside the carriage 12. When the automatic controlled vehicle 11 enters the inside of the carriage 12, the vehicle 11 moves forward toward the gap G1 in the guide rail section 73. According to the moving direction of the automatic controlled vehicle 11, the first roller 51 or the second roller 56 is guided by the first expanding portion 73a or the second expanding portion 73b. Then, the first and second rollers 51 and 56 enter the gap G1 of the guide rail section 73.

The gap G1 of the guide rail section 73 is greater than the diameter D1 (shown in FIG. 4) of the first roller 51 and the diameter of the second roller 56. With this structure, when the first roller 51 and the second roller 56 enter the gap G1, the first roller 51 and the second roller 56 are rotated while touching one of the rail members 71 and 72, respectively. Thus, the rollers 51 and 56 are rotated, it is possible to avoid generation of dust, which may be caused by the first roller 51 and the second roller 56 rubbing against the guide rail section 73.

FIG. 7 illustrates the state where the automatic controlled vehicle 11 has been moved to a predetermined position (the coupling position) with respect to the carriage 12. At this time, the lock member 74 is located at the first position (the standby position). When the automatic controlled vehicle 11 is moved to a predetermined position with respect to the carriage 12, the roller assemblies 31 and 32 are detected by the sensors 76, and the automatic controlled vehicle 11 is stopped. At this time, the first and second rollers 51 and 56 are located in the gap G1 of the guide rail section 73.

FIG. 8 illustrates the state where the lock member 74 has been moved to the second position (the lock position). The lock member 74 is moved from the first position to the second position by the actuator 75 (shown in FIGS. 3 and 5). When the lock member 74 is moved to the second position, the relative positions of the automatic controlled vehicle 11 and the carriage 12 may be displaced with respect to each other along the length direction of the guide rail section 73. In that case, the third roller 53 or the fourth roller 57 is brought into contact with the one tapered surface 94 or the other tapered surface 95.

When the lock member 74 moves from the first position toward the second position, the third and fourth rollers 53 and 57 are brought into contact the tapered surfaces 94 and 95, respectively. At this time, the third and fourth rollers 53 and 57 are able to rotate. Therefore, it is possible to avoid generation of particles (dust), which may occur when the lock member 74 is moved to the second position.

The first roller 51 and the third roller 53 are provided on the first common shaft 50. The first roller 51 and the third roller 53 rotate independently of each other. In other words, the first roller 51 and the third roller 53 can rotate in different directions from each other. For example, when the first roller 51 enters the guide rail section 73, the first roller 51 rotates. For example, when the lock member 74 moves toward the second position, the third roller 53 rotates. The first roller 51 and the third roller 53 can rotate independently of each other. With this structure, even if the direction of rotation of the first roller 51 and the direction of rotation of the third roller 53 are different from each other, the rotation of the first roller 51 and the rotation of the third roller 53 do not interfere with each other. Therefore, the first roller 51 and the third roller 53 can rotate without problems.

The second roller 56 and the fourth roller 57 are provided on the second common shaft 55. The second roller 56 and the fourth roller 57 rotate independently of each other. In other words, the second roller 56 and the fourth roller 57 can rotate in different directions from each other. For example, when the second roller 56 enters the guide rail section 73, the second roller 56 rotates. For example, when the lock member 74 moves toward the second position, the fourth roller 57 rotates. The second roller 56 and the fourth roller 57 can rotate independently of each other. Therefore, even if the direction of rotation of the second roller 56 and the direction of rotation of the fourth roller 57 are different from each other, the rotation of the second roller 56 and the rotation of the fourth roller 57 do not interfere with each other. Thus, the second roller 56 and the fourth roller 57 can rotate without any problem.

FIG. 8 shows the state in which the lock member 74 has moved to the second position. When the lock member 74 is moved to the second position, the lock member 74 is sandwiched between the third roller 53 and the fourth roller 57. With the lock member 74 sandwiched between the third roller 53 and the fourth roller 57, and with the first roller 51 and the second roller 56 positioned in the gap G1 of the guide rail section 73, the automatic controlled vehicle 11 runs.

For example, the automatic controlled vehicle 11 runs in the first direction F1 (shown in FIG. 1). Or, the automatic controlled vehicle 11 runs in the second direction F2. Here, the lock member 74 is sandwiched between the third and fourth rollers 53 and 57, and therefore the automatic controlled vehicle 11 and the carriage 12 can be securely coupled to each other against the load applied to the coupling mechanism 13 when running.

Because the first and second rollers 51 and 56 are inserted to the gap G1 of the guide rail section 73, the relative movement of the automatic controlled vehicle 11 and the carriage 12 in the width direction is inhibited by the guide rail section 73. When the automatic controlled vehicle 11 and the carriage 12 swivel around the vertical axis Z1, a load (torque) in the rotational direction is applied to the coupling mechanism 13. Even against the load in the rotational direction, the coupling mechanism 13 can exhibit a great deal of strength.

While the automatic controlled vehicle 11 and the carriage 12 being coupled to each other, the automatic controlled vehicle 11 automatically runs along a predetermined route. Thus, the object to be carried out, on the carriage 12 is carried out to a predetermined location. The automatic controlled vehicle 11 and the carriage 12 may swivel around the vertical axis Z1 in order to change direction. When the automatic controlled vehicle 11 swivels around the vertical axis Z1, the casters 21, 22, 23 and 24 are turned and rotated. Thus, a large force is applied to the coupling mechanism 13.

Against the rotation around the vertical axis Z1, the first roller 51 and the second roller 56 are constrained by the guide rail section 73. Moreover, the third and fourth rollers 53 and 57 are fixed by the lock member 74. As a result, the coupling mechanism 13 can exhibit great strength against the load applied when the automatic controlled vehicle 11 and the carriage 12 move back and forth with relative to each other or swivel around the vertical axis Z1.

The first roller 51 and the third roller 53 of the coupling mechanism 13 of this embodiment are attached to the first common shaft 50. Further, the second roller 56 and the fourth roller 57 are attached to the second common shaft 55. In other words, while having four rollers 51, 53, 56 and 57, it suffices if only two common shafts 50 and 55 are used. Such a structure exhibits the advantage of reducing the number of parts and making it easy to secure a space for mounting the common shafts 50 and 55.

Figure 9:
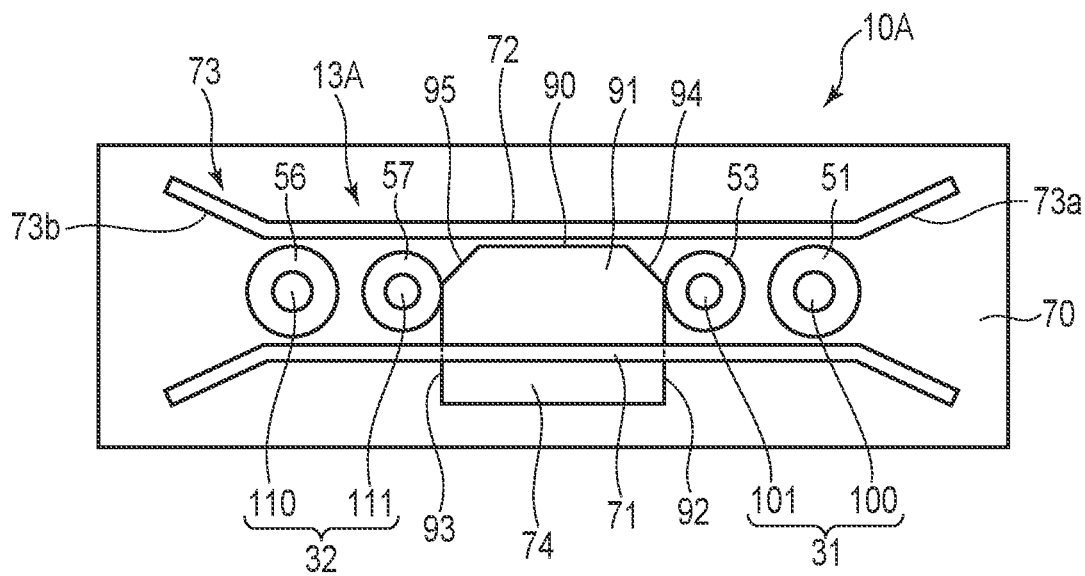
FIG. 9 is a plan view schematically showing a part of a carrier device according to a second embodiment.
Figure 10:
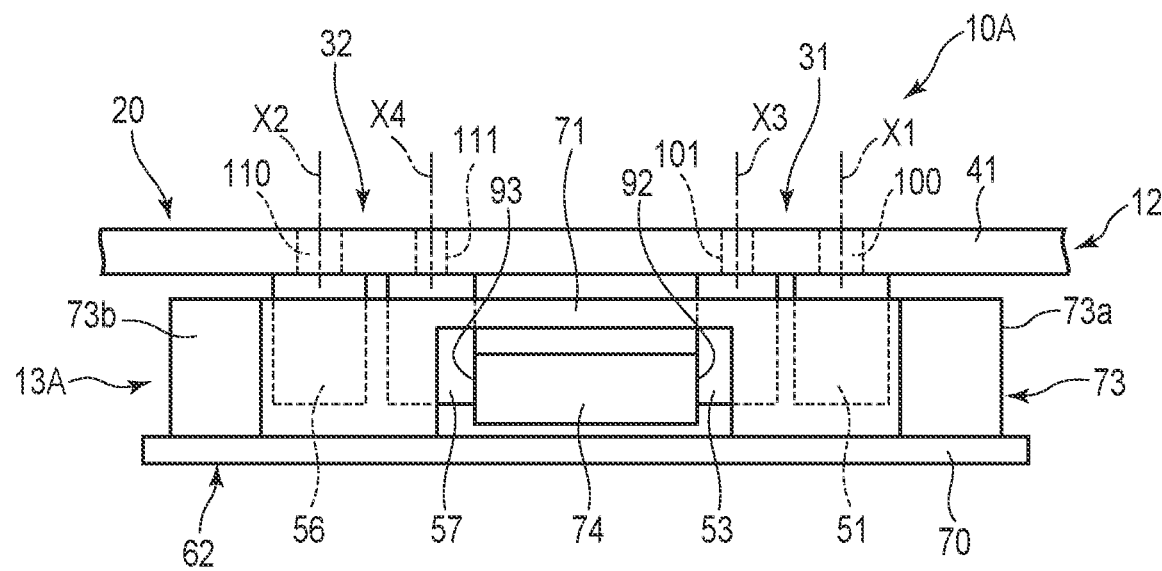
FIG. 10 is a side view schematically showing a part of the carrier device shown in FIG. 9.

FIG. 9 is a plan view schematically showing a part of a coupling mechanism 13A of a carrier device 10A of the second embodiment. FIG. 10 is a side view schematically showing a part of the coupling mechanism 13A. For the carrier device 10A, parts in common with the carrier device 10 of the first embodiment (FIGS. 1 to 8) are denoted by common reference symbols with those of the carrier device 10 of the first embodiment and the explanations thereof will be omitted.

The coupling mechanism 13A of the second embodiment comprises a first roller 51 and a third roller 53, which constitutes a first roller assembly 31, and a second roller 56 and a fourth roller 57, which constitute a second roller assembly 32.

The first roller 51 and the third roller 53 are attached to shaft members 100 and 101, respectively, which are independent of each other. The first roller 51 rotates around the first axial line X1. The first axial line X1 extends in the vertical direction. The third roller 53 rotates around the third axial line X3. The third axial line X3 is parallel to the first axial line X1 and extends in the same direction as that of the first axial line X1. The third roller 53 rotates independently of the first roller 51. The diameter of the first roller 51 is greater than that of the third roller 53.

The second roller 56 and the fourth roller 57 are attached to shaft members 110 and 111, respectively, which are independent of each other. The second roller 56 rotates around the second axial line X2. The second axial line X2 extends in the vertical direction. The fourth roller 57 rotates around the fourth axial line X4. The fourth axial line X4 is parallel to the second axial line X2 and extends in the same direction as that of the second axial line X2. The fourth roller 57 rotates independently of the second roller 56. The diameter of the second roller 56 is greater than that of the fourth roller 57.

The first roller 51 and the second roller 56 enter the gap G1 of the guide rail section 73. As the lock member 74 moves from the first position to the second position, the lock member 74 is sandwiched between the third roller 53 and the fourth roller 57. In this way, the automatic controlled vehicle and the carriage can be securely coupled to each other.

When implementing the present invention, it is only natural to carry out by remodeling specific embodiments thereof in various ways, for the specific structures of the automatic controlled vehicle and the carriage, as well as, for example, the first and second roller assemblies, guide rail sections, lock members, actuators, etc., which constitute the coupling mechanism.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A carrier device comprising a coupling mechanism that couples an automatic controlled vehicle to a carriage,
    the coupling mechanism comprising:
    a first roller disposed on the carriage so as to be rotatable around a first axial line extending in a vertical direction;
    a second roller disposed on the carriage at an interval from the first roller in a horizontal direction, so as to be rotatable around a second axial line extending in the vertical direction;
    a third roller disposed on the carriage so as to be rotatable around a third axial line extending in a same direction as the first axial line, independent of the first roller;
    a fourth roller disposed on the carriage so as to be rotatable around an axis extending in a same direction as a direction in which the second axis extends, independent of the second roller;
    a guide rail section disposed on the automatic controlled vehicle, the guide rail section including a pair of rail members extending in the horizontal direction, the pair of rail members being spaced apart from each other via a gap into which the first roller and the second roller can enter, and the guide rail section inhibiting relative movement between the automatic controlled vehicle and the carriage in a state where the first roller and the second roller are inserted into the gap;
    a lock member provided in the automatic controlled vehicle so as to be movable between a first position and a second position, the lock member being sandwiched between the third roller and the fourth roller when the lock member is moved from the first position to the second position, and the lock member inhibiting relative movement between the automatic controlled vehicle and the carriage in a state where the lock member is sandwiched between the third roller and the fourth roller; and an actuator which moves the lock member between the first position and the second position.

2. The carrier device of claim 1, further comprising:

a first common shaft that supports the first roller and the third roller rotatably, a diameter of the first roller being greater than a diameter of the third roller; and a second common shaft that supports the second roller and the fourth roller rotatably, a diameter of the second roller being greater than a diameter of the fourth roller.

3. The carrier device of claim 2, wherein each of the first roller, the second roller, the third roller, and the fourth roller comprises a roller body made of a material having rubber elasticity.

4. The carrier device of claim 2, wherein the lock member includes:

an end surface that is at a front side when moving from the first position to the second position;

one side surface and another side surface, which are at a rear side during the moving from the first position to the second position; and a pair of tapered surfaces, a distance between the pair of tapered surfaces decreasing from the one side surface and the another side surface toward the end surface, wherein when the lock member is moved to the second position, the third roller is brought into contact with one of the pair of tapered surfaces and the fourth roller is brought into contact with the other one of the pair of tapered surfaces.

5. The carrier device of claim 1, wherein the guide rail section comprises:

straight portions, provided parallel to each other, that form respective longitudinal parts of the pair of rail members;

a first expanding portion at which the gap expands as a distance from one end of the straight portions increases; and a second expanding portion at which the gap expands as a distance from the other end of the straight portions increases.

* * * * *